US009848132B2

(12) United States Patent
Newman et al.

(10) Patent No.: US 9,848,132 B2
(45) Date of Patent: Dec. 19, 2017

(54) MULTI-CAMERA TIME SYNCHRONIZATION

(71) Applicant: GoPro, Inc., San Mateo, CA (US)

(72) Inventors: David A. Newman, San Diego, CA (US); Phil Johnston, II, Los Altos, CA (US)

(73) Assignee: GoPro, Inc., San Mateo, CA (US)

( * ) Notice: Subject to any disclaimer, the term of this patent is extended or adjusted under 35 U.S.C. 154(b) by 29 days.

(21) Appl. No.: 14/951,482

(22) Filed: Nov. 24, 2015

(65) Prior Publication Data

US 2017/0150236 A1    May 25, 2017

(51) Int. Cl.
*H04N 5/765* (2006.01)
*H04N 5/247* (2006.01)
(Continued)

(52) U.S. Cl.
CPC .............. *H04N 5/247* (2013.01); *H04N 5/77* (2013.01); *H04N 5/91* (2013.01)

(58) Field of Classification Search
CPC .................................. H04N 5/77; H04N 5/91
USPC .................. 386/201, 223, 279, 281
See application file for complete search history.

(56) References Cited

U.S. PATENT DOCUMENTS 5,260,779 A * 11/1993 Wasserman .......... G01N 21/956
                                                          348/126
5,555,895 A *  9/1996 Ulmer .................... A61B 3/113
                                                          351/210

(Continued)

FOREIGN PATENT DOCUMENTS

EP       0605045 A1    7/1994
EP       0650299 A1    4/1995
(Continued)

OTHER PUBLICATIONS

Ryan Jackson: 'Shooting 360-degree video with four GoPro HD Hero cameras / Ryan Jackson Photography' Feb. 8, 2011 (Feb. 8, 2011), XP055099926, Extrait de l'Internet: URL:http://punkoryan.com/2011/02/08/shooting-360-degree-video-with-four-gopro-hd-hero-cameras [extrait le Feb. 3, 2014] 37 pages.

(Continued)

*Primary Examiner* — Helen Shibru
(74) *Attorney, Agent, or Firm* — Sheppard Mullin Richter & Hampton LLP

(57) ABSTRACT

Video clips and images captured by one device (e.g., a camera) are associated with one or more synchronization labels such as synchronization device labels and synchronization time labels determined by the device. Synchronization device labels can be used to identify devices that are synchronized. Synchronization time labels indicate relative timing between the devices that are synchronized. When a device is on, it transmits a synchronization signal and receives another synchronization signal transmitted by another device in response to receiving the synchronization signal it has transmitted. The two devices each calculate a synchronization device label and a synchronization time label using the synchronization signals and associate the synchronization device label and synchronization time label with video frames and images captured. Video clips and images can subsequently be aligned using the associated synchronization device labels and the synchronization time labels.

20 Claims, 8 Drawing Sheets

(51) Int. Cl.
*H04N 5/91* (2006.01)
*H04N 5/77* (2006.01)

(56) References Cited

U.S. PATENT DOCUMENTS

| | | | |
|---|---|---|---|
| 6,434,265 B1 | 8/2002 | Xiong | |
| 6,486,908 B1 | 11/2002 | Chen | |
| 6,710,740 B2 | 3/2004 | Needham | |
| 6,711,293 B1 | 3/2004 | Lowe | |
| 6,788,333 B1 | 9/2004 | Uyttendaele | |
| 7,057,663 B1* | 6/2006 | Lee | H04N 5/247 348/423.1 |
| 7,403,224 B2 | 7/2008 | Fuller | |
| 7,983,502 B2 | 7/2011 | Cohen | |
| 8,411,166 B2 | 4/2013 | Miyata | |
| 8,606,073 B2 | 12/2013 | Woodman | |
| 8,670,030 B2 | 3/2014 | Tanaka | |
| 8,793,332 B2* | 7/2014 | Alsina | G06Q 10/109 455/411 |
| 8,842,197 B2 | 9/2014 | Singh | |
| 8,890,954 B2 | 11/2014 | O'Donnell | |
| 8,896,694 B2 | 11/2014 | O'Donnell | |
| 9,019,396 B2 | 4/2015 | Kiyoshige | |
| 9,129,640 B2* | 9/2015 | Hamer | H04N 21/21805 |
| 9,158,304 B2 | 10/2015 | Fleck | |
| 9,342,534 B2 | 5/2016 | Singh | |
| 9,409,646 B2 | 8/2016 | Fleck | |
| 9,473,758 B1 | 10/2016 | Long | |
| 9,602,795 B1 | 3/2017 | Matias | |
| 2002/0112005 A1 | 8/2002 | Namias | |
| 2002/0122113 A1 | 9/2002 | Foote | |
| 2002/0191087 A1 | 12/2002 | Hashimoto | |
| 2003/0085992 A1 | 5/2003 | Arpa | |
| 2003/0098954 A1* | 5/2003 | Amir | A61B 3/113 351/210 |
| 2003/0160862 A1 | 8/2003 | Charlier | |
| 2004/0010804 A1 | 1/2004 | Hendricks | |
| 2004/0021780 A1 | 2/2004 | Kogan | |
| 2004/0047606 A1 | 3/2004 | Mikawa | |
| 2004/0075738 A1 | 4/2004 | Burke | |
| 2004/0135900 A1 | 7/2004 | Pyle | |
| 2004/0169724 A1 | 9/2004 | Ekpar | |
| 2005/0033760 A1 | 2/2005 | Fuller | |
| 2005/0062869 A1 | 3/2005 | Zimmermann | |
| 2005/0104976 A1 | 5/2005 | Currans | |
| 2005/0134707 A1 | 6/2005 | Perotti | |
| 2005/0174435 A1* | 8/2005 | Nakajima | H04N 5/23203 348/211.99 |
| 2005/0289111 A1 | 12/2005 | Tribble | |
| 2006/0050997 A1 | 3/2006 | Imamura | |
| 2007/0030358 A1 | 2/2007 | Aoyama | |
| 2007/0053659 A1* | 3/2007 | Kiyama | G11B 20/00086 386/207 |
| 2007/0120986 A1 | 5/2007 | Nunomaki | |
| 2007/0140662 A1 | 6/2007 | Nunomaki | |
| 2007/0300249 A1* | 12/2007 | Smith | H04H 20/31 725/19 |
| 2008/0094499 A1 | 4/2008 | Ueno | |
| 2008/0118100 A1 | 5/2008 | Hayashi | |
| 2009/0210707 A1* | 8/2009 | De Lutiis | H04L 63/123 713/170 |
| 2009/0251558 A1 | 10/2009 | Park | |
| 2009/0262206 A1 | 10/2009 | Park | |
| 2009/0271447 A1* | 10/2009 | Shin | G06F 17/30194 |
| 2010/0045773 A1 | 2/2010 | Ritchey | |
| 2010/0097443 A1 | 4/2010 | Lablans | |
| 2010/0238304 A1 | 9/2010 | Miyata | |
| 2010/0250022 A1 | 9/2010 | Hines | |
| 2010/0289924 A1 | 11/2010 | Koshikawa | |
| 2010/0299630 A1 | 11/2010 | McCutchen | |
| 2011/0013778 A1 | 1/2011 | Takumai | |
| 2011/0115883 A1 | 5/2011 | Kellerman | |
| 2011/0141300 A1 | 6/2011 | Stec | |
| 2011/0261227 A1 | 10/2011 | Higaki | |
| 2012/0206565 A1 | 8/2012 | Villmer | |
| 2012/0242798 A1 | 9/2012 | Mcardle | |
| 2013/0021450 A1* | 1/2013 | Yoshizawa | G11B 27/00 348/47 |
| 2013/0058532 A1 | 3/2013 | White | |
| 2013/0058619 A1 | 3/2013 | Miyakawa | |
| 2013/0127903 A1 | 5/2013 | Paris | |
| 2013/0176403 A1 | 7/2013 | Varga | |
| 2013/0177168 A1 | 7/2013 | Inha | |
| 2013/0182177 A1 | 7/2013 | Furlan | |
| 2013/0210563 A1 | 8/2013 | Hollinger | |
| 2013/0235226 A1 | 9/2013 | Karn | |
| 2014/0037268 A1 | 2/2014 | Shoji | |
| 2014/0039884 A1 | 2/2014 | Chen | |
| 2014/0240122 A1 | 8/2014 | Roberts | |
| 2015/0055937 A1 | 2/2015 | Van Hoff | |
| 2015/0058102 A1 | 2/2015 | Christensen | |
| 2015/0142211 A1 | 5/2015 | Shehata | |
| 2015/0142742 A1* | 5/2015 | Hong | G06F 17/30097 707/634 |
| 2015/0166476 A1 | 6/2015 | Chen | |
| 2015/0186073 A1 | 7/2015 | Pacurariu | |
| 2015/0189221 A1 | 7/2015 | Nakase | |
| 2015/0287435 A1 | 10/2015 | Land | |
| 2015/0288754 A1* | 10/2015 | Mosko | H04L 67/1095 709/248 |
| 2015/0304532 A1 | 10/2015 | Bart | |
| 2015/0336015 A1 | 11/2015 | Blum | |
| 2015/0339301 A1* | 11/2015 | Paalborg | G06F 17/30058 715/716 |
| 2015/0348591 A1* | 12/2015 | Kaps | G11B 27/17 386/201 |
| 2015/0350614 A1 | 12/2015 | Meier | |
| 2015/0363648 A1 | 12/2015 | Li | |
| 2015/0367958 A1 | 12/2015 | Lapstun | |
| 2015/0370250 A1 | 12/2015 | Bachrach | |
| 2016/0005435 A1 | 1/2016 | Campbell | |
| 2016/0018822 A1 | 1/2016 | Nevdahs | |
| 2016/0031559 A1 | 2/2016 | Zang | |
| 2016/0054737 A1 | 2/2016 | Soll | |
| 2016/0069131 A1* | 3/2016 | Gramsch | F16H 19/06 160/188 |
| 2016/0076892 A1 | 3/2016 | Zhou | |
| 2016/0098469 A1* | 4/2016 | Allinson | G06F 17/30575 707/610 |
| 2016/0101856 A1 | 4/2016 | Kohstall | |
| 2016/0112713 A1 | 4/2016 | Russell | |
| 2016/0117553 A1* | 4/2016 | Liu | G06K 9/00577 382/159 |
| 2016/0129999 A1 | 5/2016 | Mays | |
| 2016/0139596 A1 | 5/2016 | Na | |
| 2016/0139602 A1 | 5/2016 | Kohstall | |
| 2016/0165563 A1* | 6/2016 | Jang | H04W 56/0025 370/328 |
| 2016/0179096 A1 | 6/2016 | Bradlow | |
| 2016/0189101 A1 | 6/2016 | Kantor | |
| 2016/0234438 A1 | 8/2016 | Satoh | |
| 2016/0239340 A1 | 8/2016 | Chauvet | |
| 2016/0269621 A1 | 9/2016 | Cho | |
| 2016/0295108 A1 | 10/2016 | Cao | |
| 2016/0304198 A1 | 10/2016 | Jourdan | |
| 2016/0306351 A1 | 10/2016 | Fisher | |
| 2016/0313734 A1 | 10/2016 | Enke | |
| 2016/0327950 A1 | 11/2016 | Bachrach | |
| 2016/0336020 A1 | 11/2016 | Bradlow | |
| 2016/0366290 A1 | 12/2016 | Hoshino | |

FOREIGN PATENT DOCUMENTS

| | | |
|---|---|---|
| EP | 0661672 A1 | 7/1995 |
| WO | 2009047572 A1 | 4/2009 |
| WO | 2014090277 A1 | 6/2014 |

OTHER PUBLICATIONS

PCT International Search Report for PCT/EP2014/061897 dated Sep. 15, 2014, 3 pages.

(56) References Cited

OTHER PUBLICATIONS

Mai Zheng et al: "Stitching Video from Webcams", Dec. 1, 2008 (Dec. 1, 2008), Advances in Visual Computing: 4th International Symposium, ISVC 2008, Las Vegas, NV, USA, Dec. 1-3, 2008. Proceedings, Part II, Springer Berlin Heidelberg, Berlin, Heidelberg, pp. 420-429, XP019112243, ISBN: 978-3-540-89645-6 le document en entier.
PCT International Search Report for PCT/EP2014/058008 dated May 26, 2014, 3 pages.
Foote J et al: 'FlyCam: Practical Panoramic Video and Automatic Camera Control', Multimedia and Expo, 2000. ICME 2000. 2000 IEEE International Conference on New York, NY, USA Jul. 30-Aug. 2, 2000, Piscataway, NJ, USA,IEEE, US, vol. 3, Jul. 30, 2000 (Jul. 30, 2000), pp. 1419-1422, XP010512772, DOI: 10.1109/ICME.2000.871033 ISBN: 978-0-7803-6536-0.
Hossein Afshari et al: "The Panoptic Camera: A Plenoptic Sensor with Real-Time Omnidirectional Capability", Journal of Signal Processing Systems, vol. 70, No. 3, Mar. 14, 2012 (Mar. 14, 2012), pp. 305-328, XP055092066, ISSN: 1939-8018, DOI: 10.1007/s11265-012-0668-4.
Benjamin Meyer et al: "Real-time Free-Viewpoint Navigation from Compressed Multi-Video Recordings", Proc. 3D Data Processing, Visualization and Transmission (3DPVT), May 31, 2010 (May 31, 2010), pp. 1-6, XP055091261, Extrait de l'Internet: URL:http://www.cg.cs.tu-bs.de/media/publications/meyer2010realtime.pdf [extrait le Dec. 3, 2013].
Lipski, C.: "Virtual video camera", SIGGRAPH '09: Posters on, SIGGRAPH '09, vol. 0, Jan. 1, 2009 (Jan. 1, 2009), pp. 1-1, XP055091257, New York, New York, USA DOI: 10.1145/1599301.1599394.
Felix Klose et al: "Stereoscopic 3D View Synthesis From Unsynchronized Multi-View Video", Proc. European Signal Processing Conference (EUSIPCO), Barcelona, Spain, Sep. 2, 2011 (Sep. 2, 2011), pp. 1904-1909, XP055091259, Extrait de l'Internet: URL:http://www.cg.cs.tu-bs.de/media/publications/eusipco2011_3d_synth.pdf [extrait le Dec. 3, 2013].
PCT International Search Report for PCT/EP2014/057352 dated Jun. 27, 2014, 3 pages.
Farin et al., "Shortest Circular Paths on Planar Graphs," In 27th Symposium on Information Theory in the Benelux 2006, 8 pgs.
Zhi et al., "Toward Dynamic Image Mosaic Generation With Robustness to Parallax," IEEE Transactions on Image Processing, vol. 21, No. 1, Jan. 2012, pp. 366-378.
Perazzi et al., "Panoramic Video from Unstructured Camera Arrays," Eurographics, vol. 34 (2015), No. 2, 12pgs.
U.S. Appl. No. 14/920,427, filed Oct. 22, 2015, entitled "Apparatus and Methods for Embedding Metadata Into Video Stream" 62 pages.
U.S. Appl. No. 14/949,786, filed Nov. 23, 2015, entitled "Apparatus and Methods for Image Alignment" 67 pages.
U.S. Appl. No. 14/927,343, filed Oct. 29, 2015, entitled "Apparatus and Methods for Rolling Shutter Compensation for Multi-Camera Systems" 45 pages.
U.S. Appl. No. 15/001,038, filed Jan. 19, 2016, entitled "Metadata Capture Apparatus and Methods" 54 pages.
"Spatial Audio Lecture Series," Regents of the University of California at Berkeley, Center for New Music and Audio Technologies, 2015, 1 Page, [online] [retrieved on Aug. 20, 2015] Retrieved from the internet <URL:http:l/cnmat.berkeley.edu/spatialaudiolectures>.
O'Donovan, A., et al., "Real Time Capture of Audio Images and their Use with Video," 2007 IEEE Workshop on Applications of Signal Processing to Audio and Acoustics, Oct. 21-24, 2007, pp. 10-13.
O'Donovan, A., et al., "Audio-Visual Panoramas and Spherical Audio Analysis using the Audio Camera," C1 Proceedings of the 16th International Conference on Auditory Display, Jun. 9-15, 2010, pp. ICAD-167-168, can be retrieved at <URL: https://smartech.gatech.edu/bitstream/handle/1853/49858/0%27DonovanDuraiswami201_O.pdf?sequence=1 >.
PCT International Search Report and Written Opinion for PCT/US15/38913, dated Sep. 29, 2015, 15 Pages.

* cited by examiner

MULTI-CAMERA TIME SYNCHRONIZATION

BACKGROUND

Technical Field

This disclosure relates to a camera system, and more specifically, to time synchronization in multi-camera environments.

Description of the Related Art

Digital cameras have become ubiquitous. Multi-camera storytelling enables more comprehensive coverage of an event from different perspectives. To support multi-camera storytelling, multiple cameras need to be synchronized when shooting an event. Users are otherwise prevented from editing footage captured by the multiple cameras. However, it is very difficult to synchronize cameras using an external time signal. Cameras' internal clocks are likely to drift and are not very accurate. Users' experiences can be diminished if users are required to synchronize all cameras prior to shooting. Adding a master controller such as a timing master accessory (e.g., a WiFi remote control) will limit the consumer applications to only those users who proactively synchronize cameras. GPS signals may not provide sufficient time accuracy and at the same time consume a lot of power, thereby reducing a device's battery life.

BRIEF DESCRIPTIONS OF THE DRAWINGS

The disclosed embodiments have other advantages and features which will be more readily apparent from the following detailed description of the invention and the appended claims, when taken in conjunction with the accompanying drawings, in which:

DETAILED DESCRIPTION

Figure 1A:
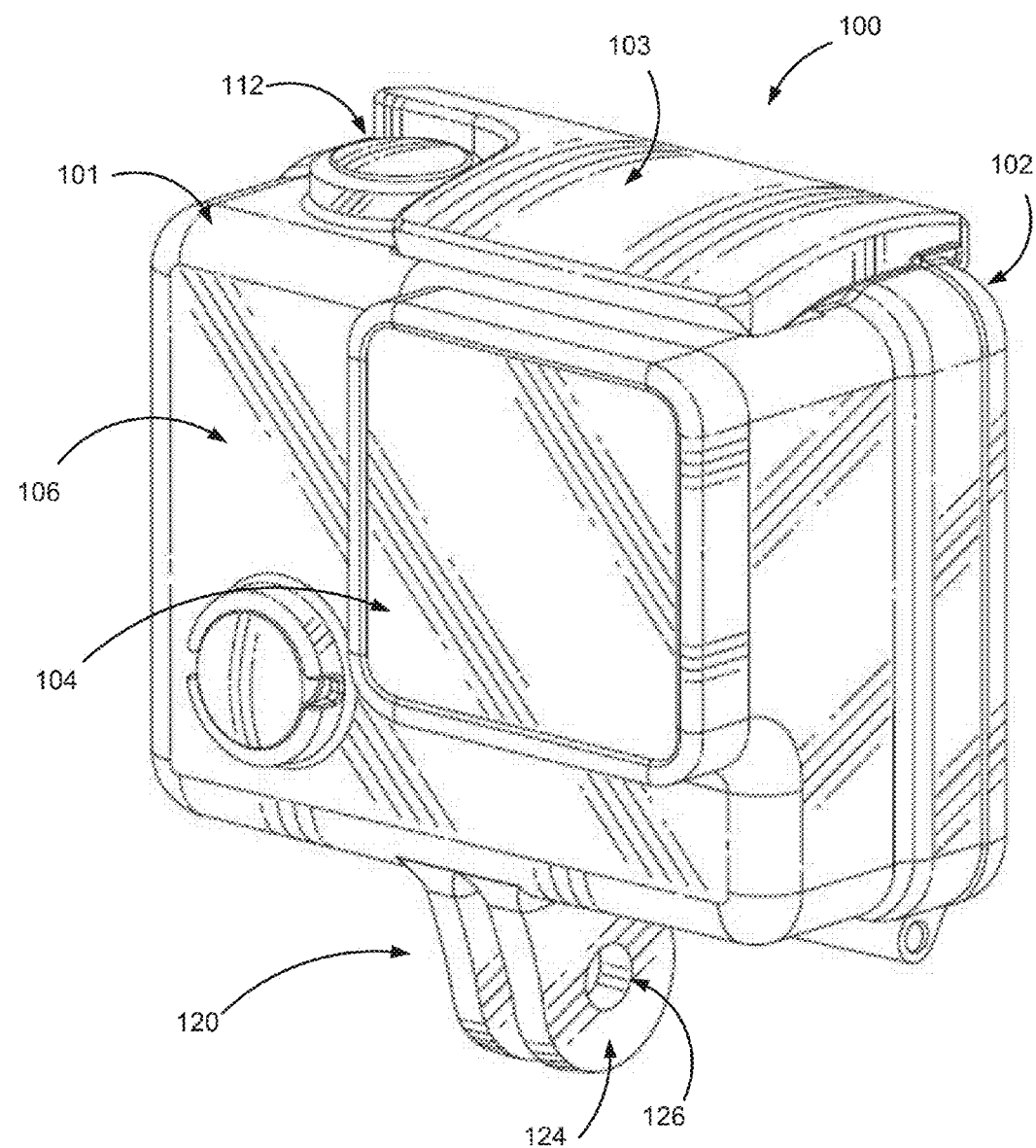
FIG. 1a illustrates a perspective view of a camera system, according to one embodiment.

Video clips and images can be aligned based on their capturing time to support a multi-camera storytelling. Video clips and images captured by one device (e.g., a camera) are associated with one or more synchronization labels such as synchronization device labels and synchronization time labels, both of which are generated by the device. Synchronization device labels can be used to identify devices that are synchronized. Synchronization time labels indicate relative timing between devices that are synchronized. When a first device is on, it transmits a first synchronization signal including device information such as the camera identifier and current date and time of the first device. The first device receives a second synchronization signal from a second device in response to the receipt by the second device of the first synchronization signal. Each of the two devices calculates a synchronization device label and a synchronization time label based on the first and second synchronization signals and associates the synchronization device label and synchronization time label with the video frames and images captured by the device. Video clips and images captured by synchronized devices can subsequently be aligned using the associated synchronization device labels and the synchronization time labels, for instance in post-processing.

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Example Camera System Configuration

A camera system includes a camera and a camera housing structured to at least partially enclose the camera. The camera comprises a camera body having a camera lens structured on a front surface of the camera body, various indicators on the front of the surface of the camera body (such as LEDs, displays, and the like), various input mechanisms (such as buttons, switches, and touch-screen mechanisms), and electronics (e.g., imaging electronics, power electronics, etc.) internal to the camera body for capturing images via the camera lens and/or performing other functions. The camera housing includes a lens window structured on the front surface of the camera housing and configured to substantially align with the camera lens, and one or more indicator windows structured on the front surface of the camera housing and configured to substantially align with the camera indicators.

Figure 1B:
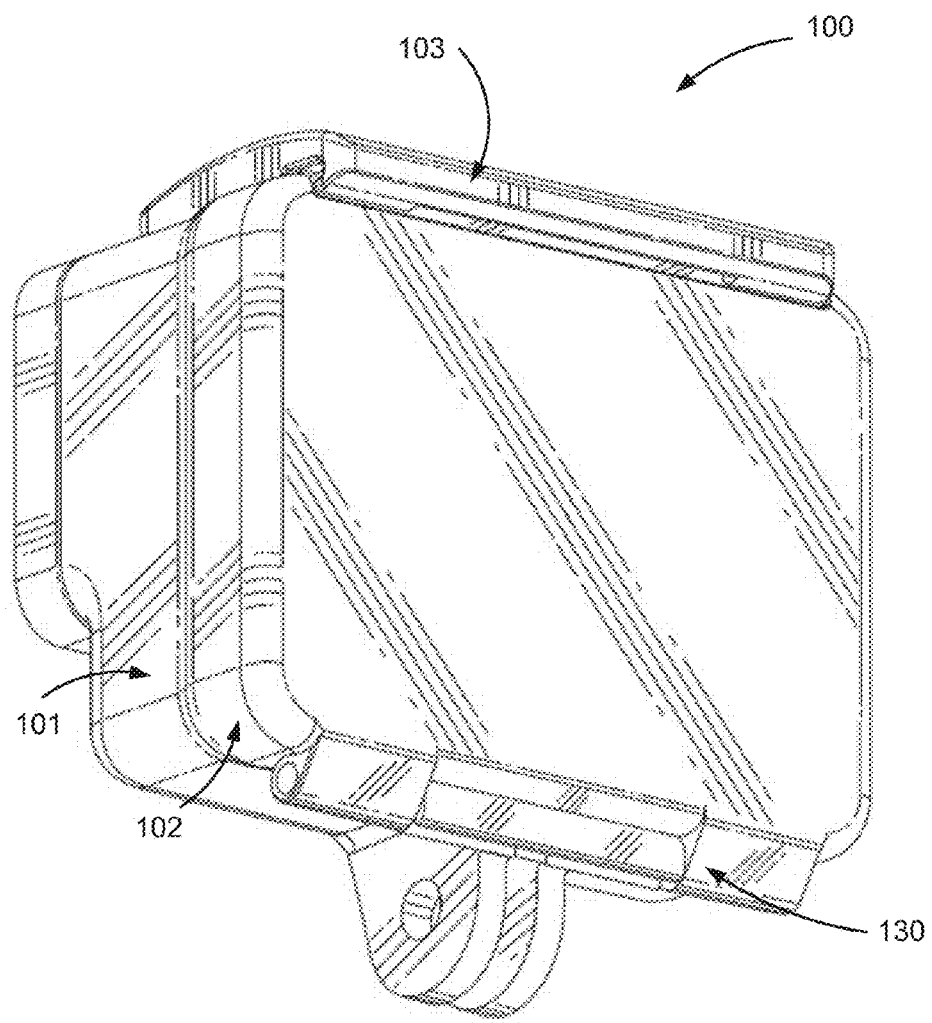
FIG. 1b illustrates a perspective view of a rear of the camera system, according to one embodiment.

FIGS. 1a and 1b illustrate various views of a camera system according to one example embodiment. The camera system includes, among other components, a camera housing 100. In one embodiment, a first housing portion 101 includes a front face with four sides (i.e., a top side, bottom side, left side, and right side) structured to form a cavity that receives a camera (e.g. a still camera or video camera), and a second housing portion 102 structured to couple to the first housing portion 101 and securely enclose a camera within the camera housing 100. The first housing portion 101 and second housing portion 102 can be pivotally coupled via a hinge mechanism (described in greater detail in FIG. 1b), and can securely couple via a latch mechanism 103. In some embodiments, the camera housing 100 may not include one or more sides or faces. For instance, the camera housing 100 may not include a front or back face, allowing the front face and rear face of the camera to be exposed when partially enclosed by the top side, bottom side, left side, and right side of the camera housing 100.

In one embodiment, the camera housing 100 has a small form factor (e.g., a height of approximately 4 to 6 centimeters, a width of approximately 5 to 7 centimeters, and a depth of approximately 1 to 4 centimeters), and is lightweight (e.g., approximately 50 to 150 grams). The camera housing 100 can be rigid (or substantially rigid) (e.g., plastic, metal, fiberglass, etc.) or pliable (or substantially pliable) (e.g., leather, vinyl, neoprene, etc.). In one embodiment, the camera housing 100 may be appropriately configured for use in various elements. For example, the camera housing 100 may comprise a waterproof enclosure that protects a camera from water when used, for example, while surfing or scuba diving.

Portions of the camera housing 100 may include exposed areas to allow a user to manipulate buttons on the camera that are associated with the camera functionality. Alternatively, such areas may be covered with a pliable material to allow the user to manipulate the buttons through the camera housing 100. For example, in one embodiment the top face of the camera housing 100 includes an outer shutter button 112 structured so that a shutter button of the camera is substantially aligned with the outer shutter button 112 when the camera is secured within the camera housing 100. The shutter button 112 of the camera is operationally coupled to the outer shutter button 112 so that pressing the outer shutter button 112 allows the user to operate the camera shutter button.

In one embodiment, the front face of the camera housing 100 includes a lens window 104 structured so that a lens of the camera is substantially aligned with the lens windows 104 when the camera is secured within the camera housing 100. The lens window 104 can be adapted for use with a conventional lens, a wide angle lens, a flat lens, or any other specialized camera lens.

In one embodiment, the camera housing 100 includes one or more securing structures 120 for securing the camera housing 100 to one of a variety of mounting devices such as a clip-style mount. In the embodiment of FIG. 1a, the camera housing 100 includes a plurality of protrusions 124, each including a hole 126 configured to receive a coupling mechanism, for instance, a turnable handscrew to pivotally couple the camera housing 100 to a mounting device including a plurality of reciprocal protrusions. In other embodiments, the camera housing 100 can be secured to a different type of mounting structure, and can be secured to a mounting structure via a different type of coupling mechanism.

In one embodiment, the camera housing 100 includes an indicator window 106 structured so that one or more camera indicators are substantially aligned with the indicator window 106 when the camera is secured within the camera housing 100. The indicator window 106 can be any shape or size, and can be made of the same material as the remainder of the camera housing 100, or can be made of any other material, for instance a transparent or translucent material and/or a non-reflective material.

The described housing 100 may also be adapted for a wider range of devices of varying shapes, sizes and dimensions besides cameras. For example, an expansion module may be attached to housing 100 to add expanded features to electronic devices such as cell phones, music players, personal digital assistants ("PDAs"), global positioning system ("GPS") units, or other portable electronic devices.

FIG. 1b is a rear perspective view of camera housing 100, according to one example embodiment. The second housing portion 102 detachably couples with the first housing portion 101 opposite the front face of the first housing portion 101. The first housing portion 101 and second housing portion 102 are collectively structured to enclose a camera within the cavity formed when the second housing portion 102 is securely coupled to the first housing portion 101 in a closed position.

In one embodiment, the second housing portion 102 pivots around a hinge mechanism 130, allowing the second housing portion 102 to be either in a closed position relative to the first housing portion 101 (for instance, when the second housing portion 102 is securely coupled to the first housing portion 101 via the latch mechanism 103), or in an open position (when the first housing portion 101 and the second housing portion 102 are not coupled via the latch mechanism 103). In the open position, a camera can be removed from or placed into the camera housing 100, and in the closed position, the camera can be securely enclosed within the camera housing 100. In one embodiment, the latch mechanism 103 includes a hook-shaped lateral bar configured to securely couple around a reciprocal structure of the second housing portion 102. In different embodiments, the latch mechanism 103 includes different fastening structures for securing the second housing portion 102 to the first housing portion 101, for example a button assembly, a buckle assembly, a clip assembly, a hook and loop assembly, a magnet assembly, a ball and catch assembly, and an adhesive assembly, or any other type of securing mechanism.

In one alternative embodiment, the hinge 130 is instead located on the top face of the housing 100, and the latch mechanism 103 is located on the bottom face of the housing 100. Alternatively, the hinge 130 and the latch mechanism 103 may be located on opposite side faces of the camera housing 100.

In one embodiment, the housing 100 includes a watertight seal so that the housing 100 is waterproof when the second housing portion 102 is in the closed position. For example, in one embodiment, the second housing portion 102 includes a sealing structure positioned on interior edges of the second housing portion 102. The sealing structure provides a watertight seal between the first housing portion 101 and the second housing portion when the latch mechanism securely couples the housing portions.

Figure 2A:
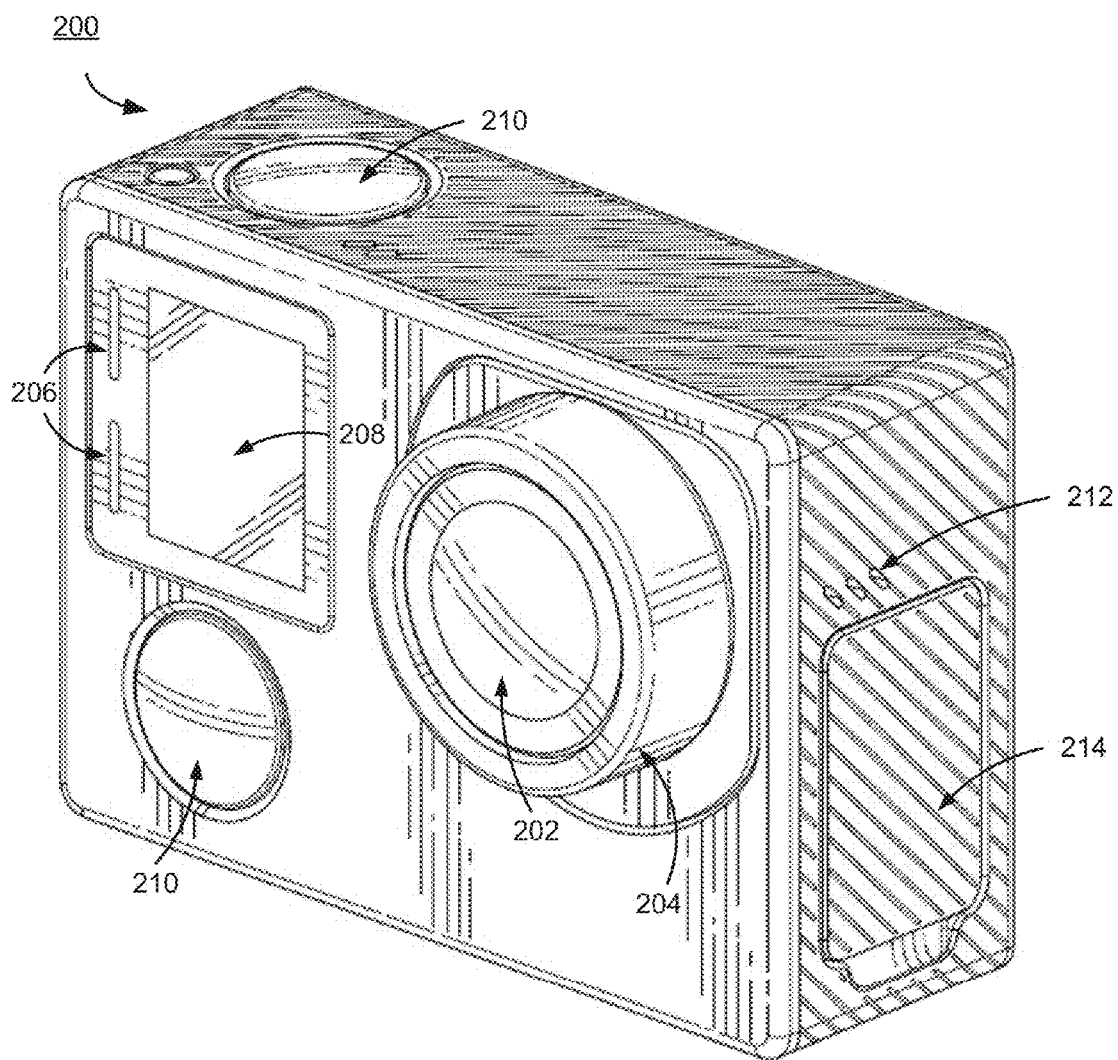
FIG. 2a illustrates a perspective view of a camera for use with the camera system, according to one embodiment.

FIG. 2a illustrates a camera 200 for use with the camera systems described herein, according to one example embodiment. The camera 200 is configured to capture images and video, and to store captured images and video for subsequent display or playback. The camera 200 is adapted to fit within a camera housing, such as the housing 100 discussed above or any other housing described herein. As illustrated, the camera 200 includes a lens 202 configured to receive light incident upon the lens and to direct received light onto an image sensor internal to the lens for capture by the image sensor. The lens 202 is enclosed by a lens ring 204.

The camera 200 can include various indicators, including the LED lights 206 and the LED display 208 shown in FIG. 2a. When the camera 200 is enclosed within the housing 100, the LED lights and the LED display 208 are configured to substantially align with the indicator window 106 and be visible through the housing 100. The camera 200 can also include buttons 210 configured to allow a user of the camera to interact with the camera, to turn the camera on, to initiate the capture of video or images, and to otherwise configure the operating mode of the camera. The camera 200 can also include one or more microphones 212 configured to receive and record audio signals in conjunction with recording video. In some embodiments, the camera 200 includes one or more sets of microphones, with each set of microphones including a first microphone and a second, dampened microphone, where the second dampened microphone is configured to capture audio at approximately 20 dB (or any other suitable magnitude) less than the first microphone. The side of the camera 200 includes an I/O interface 214. Though the embodiment of FIG. 2a illustrates the I/O interface 214 enclosed by a protective door, the I/O interface can include any type or number of I/O ports or mechanisms, such as USC ports, HDMI ports, memory card slots, and the like.

Figure 2B:
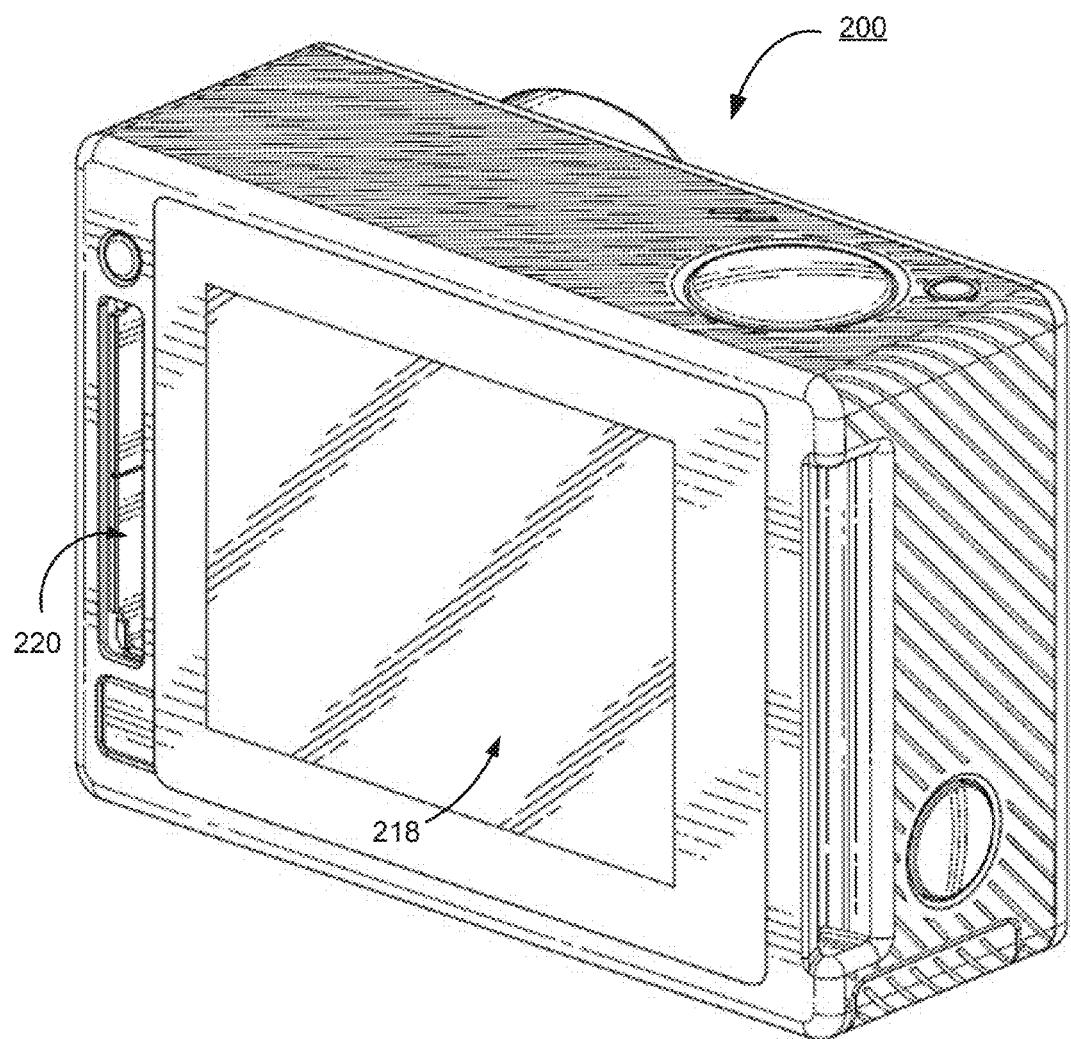
FIG. 2b illustrates a perspective view of a rear of a camera for use with the camera system, according to one embodiment.

FIG. 2b illustrates a perspective view of a rear of a camera 200 for use with the camera systems described herein, according to one embodiment. The camera 200 includes a display 218 (such as an LCD or LED display) on the rear surface of the camera 200. The display 218 can be configured for use, for example, as an electronic view finder, to preview captured images or videos, or to perform any other suitable function. The camera 200 also includes an expansion pack interface 220 configured to receive a removable expansion pack, such as an extra battery module, a wireless module, and the like. Removable expansion packs, when coupled to the camera 200, provide additional functionality to the camera via the expansion pack interface 220.

Example Camera Configuration

Figure 3:
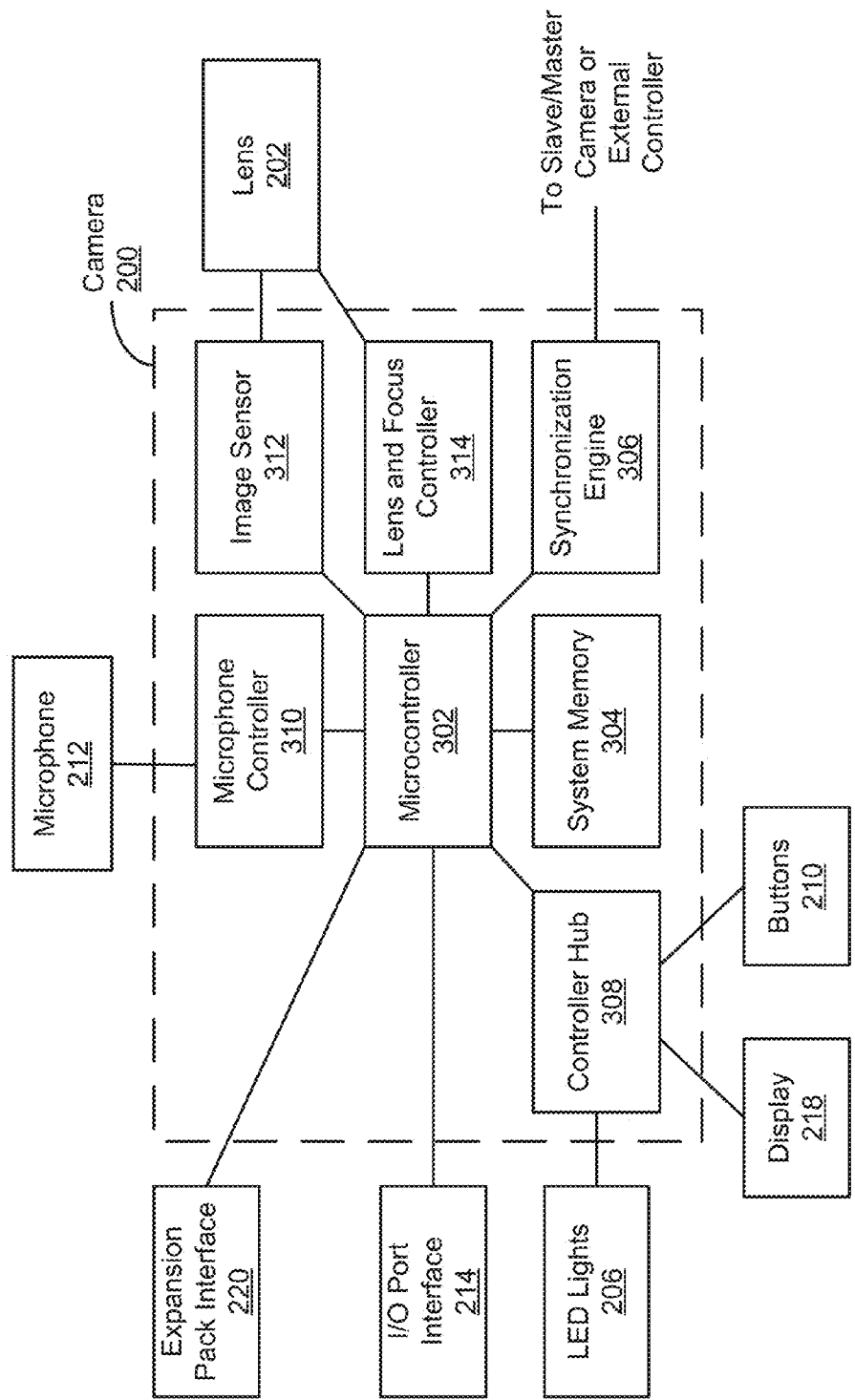
FIG. 3 is a block diagram illustrating electronic components of a camera, according to one embodiment.

FIG. 3 is a block diagram illustrating electronic components of a camera, such as the camera 200, according to one embodiment. The camera 200 includes one or more microcontrollers 302 (such as a processor) that control the operation and functionality of the camera 200. An image sensor 312 captures light directed by the lens 202 to be incident upon the image sensor, and generates image data based on the light incident upon the image sensor at the time of capture. The microcontroller 302 receives the image data generated by the image sensor 312. A lens and focus controller 314 is configured to control the operation and configuration of the camera lens 202, for instance based on user input or based on analysis of captured image data. A system memory 304 is configured to store executable computer instructions that, when executed by the microcontroller 302, perform the camera functionalities described herein. The microcontroller 302, the image sensor 312, the lens 202, and the lens and focus controller 314 can be collectively referred to as an "image capturing module". A synchronization engine 306 is configured to synchronize the camera 200 with other cameras or with other external devices, such as a remote control, a second camera (such as a slave camera or master camera), an external controller, or a smartphone. Video clips and/or images captured by cameras that are synchronized can be aligned in post-processing, as described in greater detail with respect to FIGS. 4 through 5B.

A controller hub 308 transmits and receives information from user I/O components. In one embodiment, the controller hub 308 interfaces with the LED lights 206, the display 208, and the buttons 210. However, the controller hub 308 can interface with any conventional user I/O component or components. For example, the controller hub 308 may send information to other user I/O components, such as a speaker.

A microphone controller 310 receives and captures audio signals from one or more microphones 212. The microphone controller 310 is configured to control the operation of the microphones 212. In some embodiments, the microphone controller 310 selects which microphones from which audio data is captured. For instance, for a camera 200 with multiple microphone pairs (each paid including a standard microphone and a dampened microphone), the microphone controller 310 selects one microphone of the pair to capture audio data.

Additional components connected to the microcontroller 302 include an I/O port interface 214 and an expansion pack interface 220. The I/O port interface 214 may facilitate the camera 200 in receiving or transmitting video or audio information through an I/O port. Examples of I/O ports or interfaces include USB ports, HDMI ports, Ethernet ports, audioports, and the like. Furthermore, embodiments of the I/O port interface 214 may include wireless ports that can accommodate wireless connections. Examples of wireless ports include Bluetooth, Wireless USB, Near Field Communication (NFC), and the like. The expansion pack interface 220 is configured to interface with camera add-ons and removable expansion packs, such as an extra battery module, a wireless module, and the like.

Synchronization Engine

Figure 4:
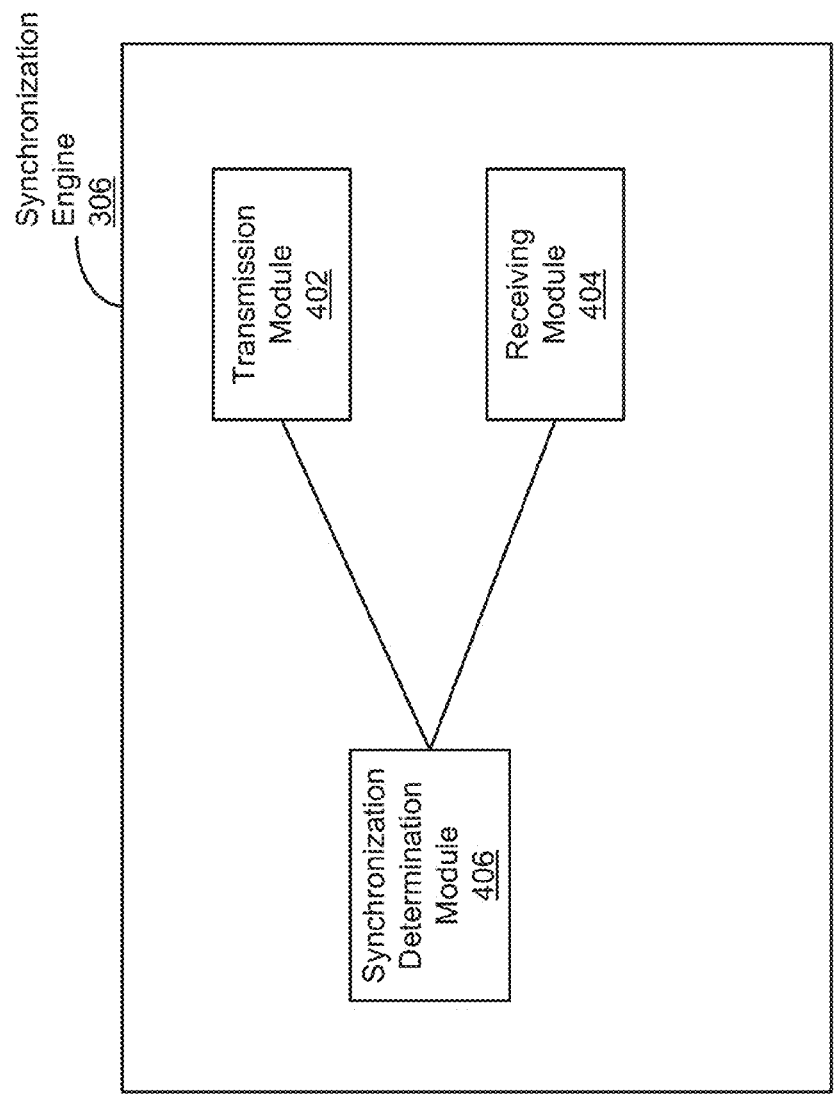
FIG. 4 is a block diagram illustrating a synchronization engine of a camera, according to one embodiment.

FIG. 4 is a block diagram illustrating a synchronization engine of a camera, according to one embodiment. The synchronization engine 306 of FIG. 4 includes a transmission module 402, a receiving module 404, and a synchronization determination module 406. The transmission module 402 transmits a synchronization signal including a unique identifier (ID) identifying the camera (e.g., the camera 200). In addition, the synchronization signal transmitted by the transmission module 402 includes a current date and time of the camera (e.g., the camera 200). A transmission module 402 can be configured to transmit synchronization signals anytime the camera is on, regardless of whether the camera is capturing images or videos. In some embodiments, the transmission module 402 is configured to transmit synchronization signals periodically (e.g., every one minute). The transmission module 402 of a slave device, in response to a synchronization signal received from a master device, transmits a corresponding synchronization signal. The synchronization signals may be based on various wireless communication protocols, such as, for example, Bluetooth, Wi-Fi such as IEEE 802.11, NFC, Zigbee, Ant+ protocol, WiFi Direct protocol, etc.

The receiving module 404 is configured to receive synchronization signals from one or more other devices. The received signals include information such as the unique IDs of the one or more other devices as well as the current date and time of the one or more other devices when they transmit the synchronization signals. In various embodiments, a device can discover the other devices using the signals received from one or more other devices. In some embodiments, a device can pair with all the devices it has discovered. In some embodiments, a device presents all the devices it has discovered to a user and pairs with only the devices selected by the user. In some embodiments, when synchronization signals travel over limited distances, only devices within a predetermined proximity can be paired. At a particular time point, a device may be paired with up to a predetermined number of other devices. Devices that are paired can be configured to actively communicate with each other. Note that devices that are paired can be synchronized, and can subsequently be unpaired. In other words, devices that are synchronized may move out of communicative range of each other—in such embodiments, the synchronized devices can still capture images and videos, can include synchronization labels with the captured images and videos, and the captured images and videos can be subsequently aligned in post-processing using the synchronization labels.

The synchronization determination module 406 determines synchronization information with one or more other devices. The synchronization information can be used to identify devices that are synchronized and to identify video frames or images that are captured substantially at the same time. In some embodiments, the synchronization determination module 406 provides the unique identifier of the device to the transmission module 402 and triggers the transmission module 402 to transmit synchronization signals including device information such as the unique identifier, the current date, or the current time at a particular time point. The synchronization determination module 406, based on the device information included in the synchronization signal received from another device, such as the unique ID, the current date, and the current time of the other device, determines the synchronization information with the other device including a synchronization device label and a synchronization time label. The synchronization determination module 406 further associates the determined synchronization information with the other device, including the synchronization device label and the synchronization time label, with one or more captured images or video frames.

The synchronization device label identifies a pair of synchronized devices including a master device and a slave device. The synchronized devices are those devices for which a temporal relationship has been established. The synchronization device label represents the unique identifiers of the devices (i.e., the unique identifier transmitted by the transmission module 402 of a master device and the unique identifier received by the receiving module 404 of a slave device). The synchronization determination modules 406 of a master device and of a slave device determine the synchronization device labels similarly such that the synchronization device labels determined by the master device and the slave device match. A master device's receiving module 404 receives a synchronization signal transmitted by a slave device in response to receiving the synchronization signal transmitted by the master device. A slave device's transmission module 402 transmits a synchronization signal in response to its receiving module 404 receiving a synchronization signal from a master device. A synchronization determination module 406 determines the synchronization device label based on the unique identifiers of the master device and of the slave device. As one example, the synchronization determination module 406 determines the synchronization device label as a sum of hash values of the unique identifiers of a master device and of a slave device. As such, devices' privacy is protected as the devices' identifiers cannot be reversely determined from synchronization device labels. In other embodiments, the synchronization determination module 406 may determine the synchronization device label as a function of the unique identifiers of the devices. Accordingly, when the synchronization device labels associated with two images or video frames captured by different devices match, it can be determined (for instance, in post-processing) that the images or video frames are captured by devices that are synchronized. The temporal relationship between the devices can also be established. That is, the relative timing between the video frames captured by the synchronized devices can be determined from the synchronization time label.

The synchronization time label indicates the relative timing between a pair of synchronized devices including a master device and a slave device. The synchronization determination module 406 of a master device determines the synchronization time label as the difference between the current date and time of the master device and that of the slave device. Conversely, the synchronization determination module 406 of a slave device determines the synchronization time label as the difference between the current date and time of the slave device and that of the master device.

As the transmission module 402 of a device may transmit synchronization signals periodically, the synchronization determination module 406 of the device may determine synchronization device labels and the synchronization time labels periodically based on the synchronization signals periodically transmitted by the transmission module 402 and the synchronization signals periodically received by the receiving module 404 from another device. For example, the synchronization determination module 406 of a device may determine the synchronization device label and the synchronization time label periodically when the transmission module 402 of the device transmits the synchronization signals. As another example, the receiving module 404 of a device provides device information such as the unique identifier, the current date, and the current time of another device to the synchronization determination module 406 upon receiving a synchronization signal from the other device. The synchronization determination module 406 of the device determines the synchronization device label and the synchronization time label upon receiving the synchronization information from the receiving module 404 of the device. As a further example, the synchronization determination module 406 of a device regularly obtains synchronization information such as the unique identifier, the current data, and the current time received from one or more other devices from the receiving module 404 and determines one or more synchronization device labels and synchronization time labels upon receiving the synchronization information from the receiving module 404.

The synchronization determination module 406 of a device modifies one or more video frames it captures with the synchronization device label and the synchronization time label. The synchronization determination module 406 of a device associates the determined synchronization device label and synchronization time label with images and video captured by the device. For example, the synchronization device label and synchronization time label can be included within image or video metadata (either within each video frame or within each video clip), in a table associating the synchronization information with captured images and videos, or The synchronization determination module 406 may associate multiple synchronization device labels and synchronization time labels with a video frame the device captures when the device is paired with multiple other devices. The synchronization determination module 406 may associate one or more video frames the device has captured or is about to capture with the determined synchronization device label and the synchronization time label. For a particular synchronization device label determined for a pair of synchronized devices, the synchronization determination module 406 of one device associates the synchronization time label with the video frames it captures until the synchronization time label is updated. In some embodiments, for a pair of synchronized devices with a particular synchronization device label, the devices update the synchronization time labels periodically to reduce the effect that various dynamic factors may have on synchronization time labels, thereby improving the accuracy of synchronization time labels. Exemplary dynamic factors include propagation delays, individual device clock drifting, or a relative distance change between the devices. For example, at a predetermined time point after a master device and a slave device have been paired, a previous master device becomes the new slave device and a previous slave device becomes the new master device. Each device calculates an updated synchronization time label, and further compares the updated synchronization time label to the previous synchronization time label, beneficially enabling the devices to account for a processing lag by one of the devices that affects the generation of the synchronization time labels. In such embodiments, the synchronization determination module 406 associates the previous or the updated synchronization time label with the video frames captured by the device, depending on which synchronization time label is determined to represent a more accurate time differential between the devices.

Temporal relationships between videos captured by different devices can be established, for example, by using synchronization device and time labels. Video clips produced by different devices can thereby be aligned and edited in a single editing environment. Devices that are synchronized capture video frames associated with the same synchronization device label. That is, video frames associated with matching synchronization device labels are captured by devices that are synchronized. The temporal relationship between the video frames captured by the synchronized devices can be determined according to the synchronization time label. That is, relative timing between the video frames or images captured by the synchronized devices can be determined and video frames or images that are captured substantially at the same time should be aligned. In various embodiments, a device associates its device identifier and a starting time point of a video clip with the video clip. As a result, a local time point when a video frame of the video clip is captured can be determined by using the starting time point of the video clip as well as the time period relative to the starting time point. The local time point of a first video frame captured by a master or slave device can be converted to a local time stamp of the slave or master device, respectively, according to the synchronization time label associated with the first video frame. The converted local time stamp of the slave or master device is used to identify a second video frame captured by the slave or master device substantially at the same time as the first video frame captured by the slave or master device, respectively. As a result, the video frames captured by the synchronized devices substantially at the same time can be determined.

In addition, temporal relationships between video clips captured by devices that are not paired may also be established. For instance, devices outside the predetermined proximity limited by the distance synchronization signals can travel cannot be paired. However, unpaired devices may be indirectly synchronized by other devices paired with those devices. For example, devices belonging to friends at opposite corners of a stadium watching a baseball game cannot be paired with each other but each of them can be paired with a common device belonging to a friend who is located in the middle of the stadium. Because temporal relationships can be established between video clips captured by devices that are synchronized and within the distance limit supported by the synchronization signals, a temporal relationship between video clips captured by a first and a second device may be established or inferred from an established temporal relationship between video clips captured by the first device and a third device, and an established temporal relationship between video clips captured by the second device and the third device. Returning to the baseball game example, relative temporal relationships between the video clips captured by the unpaired devices may be established via the synchronization time labels established with a common device. Accordingly, in a single editing environment, video clips captured by unpaired devices can be aligned and accordingly edited. For example, video clips of an event captured by unpaired devices may be uploaded to a cloud service where editing based on the temporal relationships established between the unpaired devices and a common device is provided.

Figure 5A:
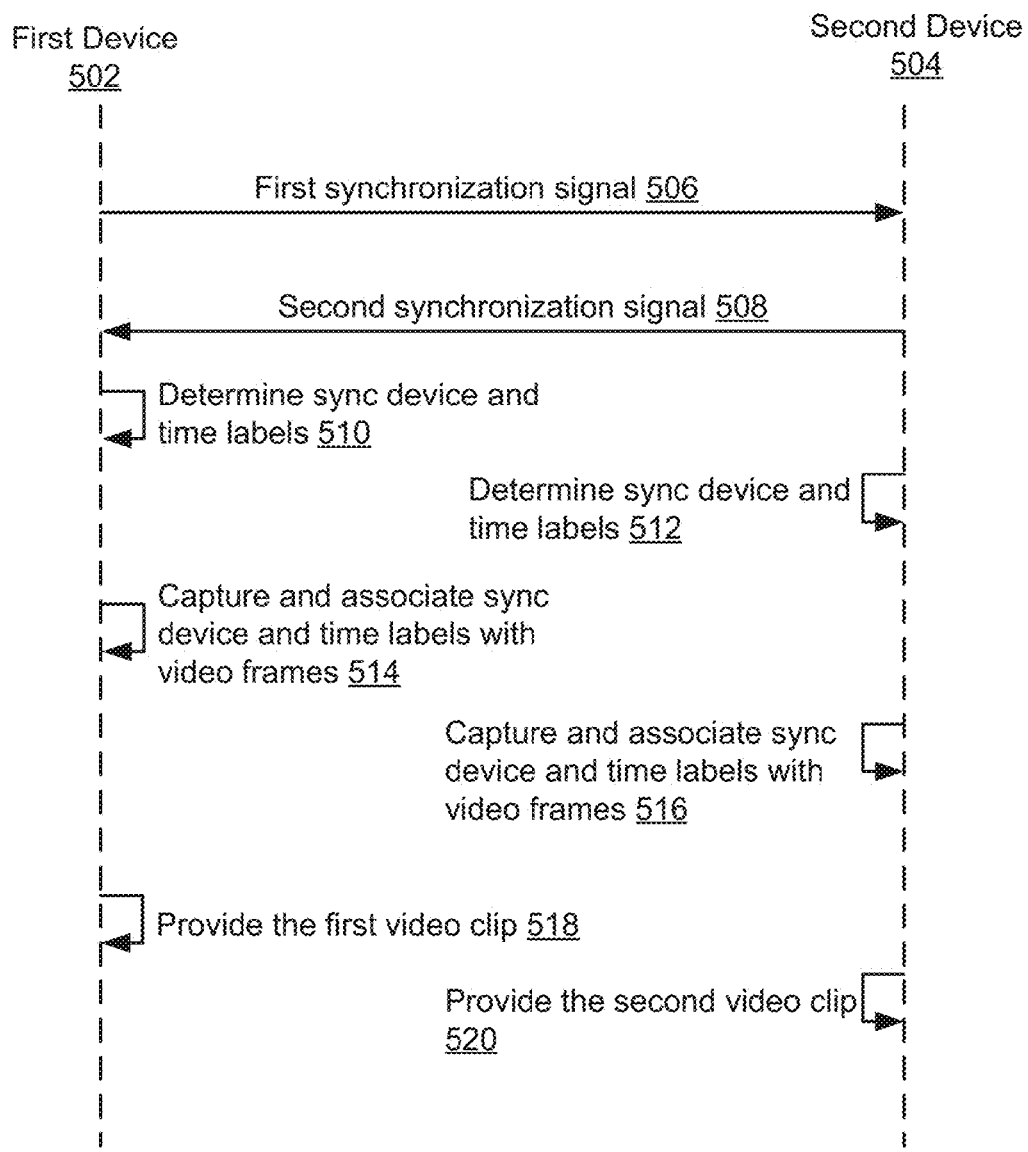
FIG. 5A is a sequence diagram illustrating a synchronization between cameras, according to one embodiment.

FIG. 5A is a sequence diagram illustrating a synchronization between cameras, according to one embodiment. A first device 502 transmits a first synchronization signal 506 and initiates the synchronization process between the first device 502 and a second device 504. The first synchronization signal 506 includes device information such as the identifier as well as the current date and time of the first device 502. The first synchronization signal 506 may be received by one or more other devices within a predetermined proximity. The first device 502 may transmit the first synchronization signal 506 periodically.

The second device 504 receives the first synchronization signal 506 and responds to the first device 502 with a second synchronization signal 508. The second synchronization signal 508 includes device information such as the identifier as well as the current date and time of the second device 504. The first device 502 determines 510 a synchronization device label and a synchronization time label based on its identifier and current date and time included in the first synchronization signal 506 and the second device's identifier and current and date and time included in the second synchronization signal 508. The second device 504 also determines 512 another synchronization device label and another synchronization time label based on the second device identifier and current date and time included in the second synchronization signal 508 as well as the first device's identifier and current date and time included in the first synchronization signal 506. The first device 502 and the slave device 504 may determine the synchronization device and time labels at the same time or at different times.

The first device 502 and the second device 504 may be paired and the synchronization device and time labels may be determined before or when one or both of the first and second devices 502 and 504 capture video or images. The first device 502 associates 514 the determined synchronization device and time labels with video frames or images captured by the first device. The second device 504 also associates 516 the determined synchronization device and time labels with video frames or images captured by the second device. Accordingly, the video frames or images captured by the first device 502 and the second device 504 can be aligned based on the synchronization device and time labels associated with each. After capturing images and/or video, the first and second devices 502 and 504 provide 518 and 520 the video clips or images, for example, to one or more users, to a cloud server, or to any other suitable device or entity. The video clips or images are associated with synchronization device and time labels and can be aligned as described with respect to FIG. 5B.

Figure 5B:
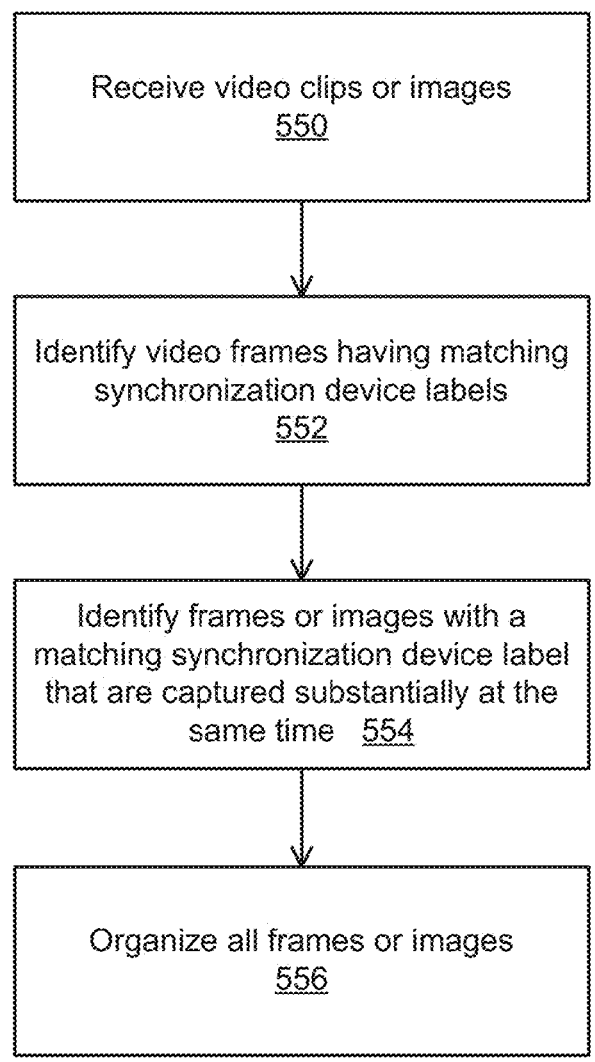
FIG. 5B is a flow diagram illustrating a method of aligning video clips and images, according to one embodiment.

FIG. 5B is a flow diagram illustrating a method of aligning video clips and images, according to one embodiment. Video frames and/or images associated with synchronization device labels and synchronization time labels generated by the devices that captured the video frames and images are received 550, for instance by a server, a desktop, or a mobile device. Users may upload video clips or images to the computing device, a storage device, or a cloud server, and can access the uploaded video clips or images with a media processing device (such as a computer or mobile device).

The media processing device identifies 552 video frames or images that have matching synchronization device labels. Video frames or images having matching synchronization device labels are captured by devices that are synchronized. That is, the temporal relationship between these video frames or images can be established using the synchronization time labels. For example, the media processing device identifies a first set of video frames from the first video clip and a second set of video frames from the second video clip. The first set of video frames and the second set of video frames each are associated with the same synchronization device label.

Among the video frames that have matching synchronization device labels, the media processing device identifies 554 the video frames or images that are captured at substantially the same time based on the synchronization time labels associated with the video frames. In other words, the media processing device identifies the video frames or images that are captured by a pair of synchronized devices at substantially the same time. The media processing device selects a first subset of video frames from the first set of video frames from the first video clip and identifies a first synchronization time label associated with the first subset of video frames. The media processing device selects a second subset of video frames from the second set of video frames based on the identified first synchronization time label and a second synchronization time label associated with the second subset of video frames. The first synchronization time label and the second synchronization time label represent a substantially similar time difference.

A local time point of a video frame can be determined based on a starting time point of the video clip including the video frame. The local time point of a first video frame captured at a first device can be converted to a corresponding local time point at the second device that is synchronized with the first device by adding or subtracting the time difference included within the synchronization time label corresponding to the second device. The media processing device can identify a second video frame captured by the second device based on the converted local time point at the second device. The second video frame and the first video frame are captured substantially at the same time. Accordingly, the media processing device can identify the video frames with matching synchronization device labels that are captured substantially at the same time.

Subsequently, the media processing device organizes 556 all video frames and images of the received video clips or images such that the video frames and images captured substantially at the same time are aligned. Accordingly, video frames and images that are captured by different devices at the same time can be correlated, combined into a single multi-camera video or set of images, and presented to a user of the media processing device, for instance via a hardware display.

Additional Configuration Considerations

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs for a camera expansion module as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. A computer-implemented method of editing video clips, comprising:
    receiving a first video clip and a second video clip, the first video clip and the second video clip each comprising a series of video frames, individual video frame associated with a synchronization device label and a synchronization time label;
    identifying a first set of video frames from the first video clip and a second set of video frames from the second video clip, the first set of video frames and the second set of video frames associated with the same synchronization device label;
    selecting a first subset of video frames from the first set of video frames;
    identifying a first synchronization time label associated with the first subset of video frames;
    selecting a second subset of video frames from the second set of video frames based on the first synchronization time label and a second synchronization time label associated with the second subset of video frames, the first synchronization time label and the second synchronization time label representative of a time difference between a first time corresponding to a first camera that captured the first video clip and a second time corresponding to a second camera that captured the second video clip; and
    combining the first subset of video frames and the second subset of video frames to produce an aligned combined video.

2. The computer-implemented method of claim 1, further comprising aligning all video frames of the first video clip and the second video clip that are captured at the same time.

3. The computer-implemented method of claim 1, wherein selecting the second subset of video frames comprises:
   determining a first local time point of a first video frame of the first subset of video frames and a second local time point of a second video frame of the second subset of video frames;
   converting the first local time point of the first video frame to a corresponding local time point of the second camera based on the first synchronization time label associated with the first video frame; and
   identifying the second video frame of the second subset of video frames according to the converted corresponding local time point and the second time local time point of the second camera, the converted corresponding local time point and the second local time point being the same.

4. The computer-implemented method of claim 1, wherein the synchronization device label is generated based on a first identifier identifying the first camera and a second identifier identifying the second camera, the synchronization device label representative of the first identifier and the second identifier.

5. The computer-implemented method of claim 4, wherein the synchronization device label is generated further based on:
   a first value determined based on the first identifier;
   a second value determined based on the second identifier; and
   a combination of the first value and the second value.

6. The computer-implemented method of claim 5, wherein the first value is a first hash value of the first identifier and the second value is a second hash value of the second identifier.

7. The computer-implemented method of claim 5, wherein the first identifier and the second identifier cannot be reversely determined from the synchronization device label.

8. The computer-implemented method of claim 4, wherein the first identifier is conveyed in a first synchronization signal transmitted by the first camera and the second identifier is conveyed in a second synchronization signal transmitted by the second camera, the second synchronization signal transmitted by the second camera in response to the second camera receiving the first synchronization signal.

9. The computer-implemented method of claim 1, wherein the first synchronization time label is generated based on a difference between the first time and the second time.

10. The computer-implemented method of claim 1, wherein the individual video frame is associated with the synchronization device label and the synchronization time label based on the synchronization device label and the synchronization time label being included within metadata of the individual video frame.

11. A system that edits video clips, comprising:
   one or more physical processors configured by machine-readable instructions to:
      receive a first video clip and a second video clip, the first video clip and the second video clip each comprising a series of video frames, individual video frame associated with a synchronization device label and a synchronization time label;
      identify a first set of video frames from the first video clip and a second set of video frames from the second video clip, the first set of video frames and the second set of video frames associated with the same synchronization device label;
      select a first subset of video frames from the first set of video frames;
      identify a first synchronization time label associated with the first subset of video frames;
      select a second subset of video frames from the second set of video frames based on the first synchronization time label and a second synchronization time label associated with the second subset of video frames, the first synchronization time label and the second synchronization time label representative of a time difference between a first time corresponding to a first camera that captured the first video clip and a second time corresponding to a second camera that captured the second video clip; and
      combine the first subset of video frames and the second subset of video frames to produce an aligned combined video.

12. The system of claim 11, wherein the one or more physical processors are further configured by the machine-readable instructions to align all video frames of the first video clip and the second video clip that are captured at the same time.

13. The system of claim 11, wherein the one or more physical processors are, to select the second subset of video frames, further configured by the machine-readable instructions to:
   determine a first local time point of a first video frame of the first subset of video frames and a second local time point of a second video frame of the second subset of video frames;
   convert the first local time point of the first video frame to a corresponding local time point of the second camera based on the first synchronization time label associated with the first video frame; and
   identify the second video frame of the second subset of video frames according to the converted corresponding local time point and the second time local time point of the second camera, the converted corresponding local time point and the second local time point being the same.

14. The system of claim 11, wherein the synchronization device label is generated based on a first identifier identifying the first camera and a second identifier identifying the second camera, the synchronization device label representative of the first identifier and the second identifier.

15. The system of claim 14, wherein the synchronization device label is generated further based on:
   a first value determined based on the first identifier;
   a second value determined based on the second identifier; and
   a combination of the first value and the second value.

16. The system of claim 15, wherein the first value is a first hash value of the first identifier and the second value is a second hash value of the second identifier.

17. The system of claim 15, wherein the first identifier and the second identifier cannot be reversely determined from the synchronization device label.

18. The system of claim 14, wherein the first identifier is conveyed in a first synchronization signal transmitted by the first camera and the second identifier is conveyed in a second synchronization signal transmitted by the second camera, the second synchronization signal transmitted by the second camera in response to the second camera receiving the first synchronization signal.

19. The system of claim 11, wherein the first synchronization time label is generated based on a difference between the first time and the second time.

20. The system of claim 11, wherein the individual video frame is associated with the synchronization device label and the synchronization time label based on the synchronization device label and the synchronization time label being included within metadata of the individual video frame.

* * * * *